United States Patent [19]

Mathers

[11] Patent Number: 4,669,775

[45] Date of Patent: Jun. 2, 1987

[54] ROLLER CURTAIN FOR TRUCK BODIES

[76] Inventor: Robert S. Mathers, 2145 Sherobee Rd. #40, Mississauga, Ontario, Canada, L5A 3G8

[21] Appl. No.: 876,075

[22] Filed: Jun. 19, 1986

[51] Int. Cl.$^4$ ............................................. B62D 25/00
[52] U.S. Cl. .................................... 296/141; 296/181; 296/183; 296/143
[58] Field of Search ............... 296/181, 183, 141, 143, 296/39 A, 24 B, 138, 50

[56] References Cited

U.S. PATENT DOCUMENTS 3,034,824  5/1962  Schubach ............................ 296/183
3,882,575  5/1975  Jolly ................................... 296/138

FOREIGN PATENT DOCUMENTS 1604591  12/1981  United Kingdom ................ 296/141

Primary Examiner—Robert R. Song
Attorney, Agent, or Firm—Donald E. Hewson

[57] ABSTRACT

A roller curtain is provided, generally in kit form for installation at the rear of a truck, just within the doors, to provide a liquid deflector preventing the general ingress of moisture which is frequently experienced. The curtain roller is installed adjacent the roof, being usually of the spring retracted type. The curtain does not seal the rear aperture, but is generally impermeable and serves to severely limit the ingress of atmospheric moisture when the truck is in motion, to thereby safeguard the load against untoward dampness and spoilation.

6 Claims, 3 Drawing Figures

ROLLER CURTAIN FOR TRUCK BODIES

FIELD OF THE INVENTION

This invention is directed towards a roller curtain for use with a truck, to limit the ingress of atmospheric moisture otherwise frequently experienced due to the motion of the truck.

BACKGROUND OF THE INVENTION

In the trucking industry it is found that the operation of transport trucks under normal road speeds induces a significant zone of reduced pressure at the rear of the vehicle, which in turn tends to create low pressure conditions within the vehicle. Under wet conditions—including especially rain, snow and slush—this leads to the ingress of undesired quantities of moisture that can lead to marked deterioration in the cargo being shipped. The damage occurs by ingress of the water, and its impingement on the cargo—which is usually crated and/or contained in cardboard boxes. Of course, once wetted, the cargo may no longer be of value; or at least it may be in an unacceptable condition to the consignee.

One partial solution to this problem has been the provision of a temporary protective sheath stapled to the walls of the vehicles. This however requires to be penetrated each time that the load is accessed, and is expensive, time consuming, and difficult to maintain between partial unloadings.

One form of truck rear enclosure comprises a roll-up door, having a plurality of transverse steel slats carried in channels, for sliding displacement from a horizontal stowed location above the door, to a deployed condition, sealing the doorway as a transversely slatted rigid closure. This arrangement is extremely heavy, difficult to deploy, and subject to severe jamming if damaged in the normal wear and tear of the trucking industry. Consequently it is seen only in specialty vehicles.

It has been found that the provision of a non-sealing impermeable curtain is surprisingly effective in limiting moisture penetration to the cargo space, while the location of the curtain roller adjacent the top of the door aperture provides substantially unimpeded access to the vehicle interior, when the curtain is retracted onto its roller.

It will be understood, in accordance with road safety and vehicle safety regulations that exterior doors are generally employed in combination with the subject curtain. However, the necessity of achieving a tight seal by such doors is now deemphasized in light of the present invention.

The present invention provides, in combination, a truck having an enclosed body, a large rear aperture comprising substantially the full cross section of the enclosed body, at least one door for substantially blocking the rear aperture when in a closed condition, and a roll-up curtain positioned within the truck body adjacent the rear aperture. The curtain structure has a roller rotatably mounted adjacent the top of the body and extending transversely thereacross in substantially parallel relation with the door when the door is in a closed condition, and a flexible curtain mounted on the roll for downward unrolling displacement therefrom. The flexible curtain has a tongue portion to overlie a portion of the floor of the truck body located inwardly of the aperture, and the flexible curtain means fills substantially all the aperture when in an extended position so as to limit the ingress of moisture therepast. The flexible curtain is withdrawable upwardly in wrapping relation with the roller, and in substantially non-blocking relation with the aperture.

While optimum results appear to accrue from the use of impermeable, high quality polyester or other plastic materials in the curtain construction, the use of more permeable, lower cost material may achieve sufficiently effective moisture control to warrant the adoption thereof.

BRIEF DESCRIPTION OF THE DRAWINGS

Certain embodiments of the invention are described, reference being made to the accompanying drawings, wherein.

DETAILED DESCRIPTION OF THE PREFERRED EMBODIMENTS

Figure 1:
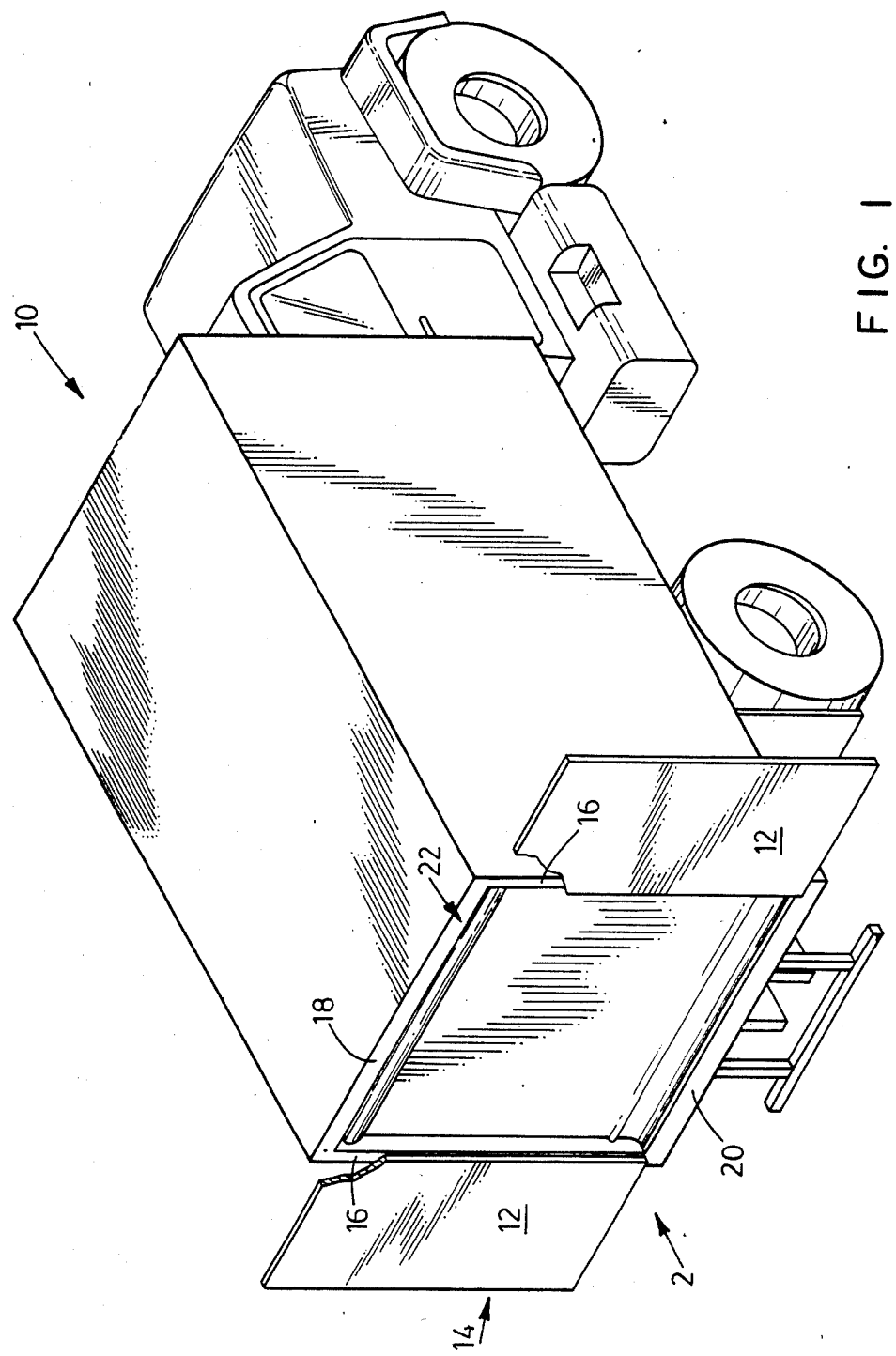
FIG. 1 is a general view of a small truck incorporating the subject curtain, illustrated in an extended condition.

FIG. 1 shows a truck 10 of the usual enclosed box type, as used for general cargo. It will be understood that the subject curtain is of equal utility in combination with the larger semi's, or a smaller panel truck.

Figure 2:
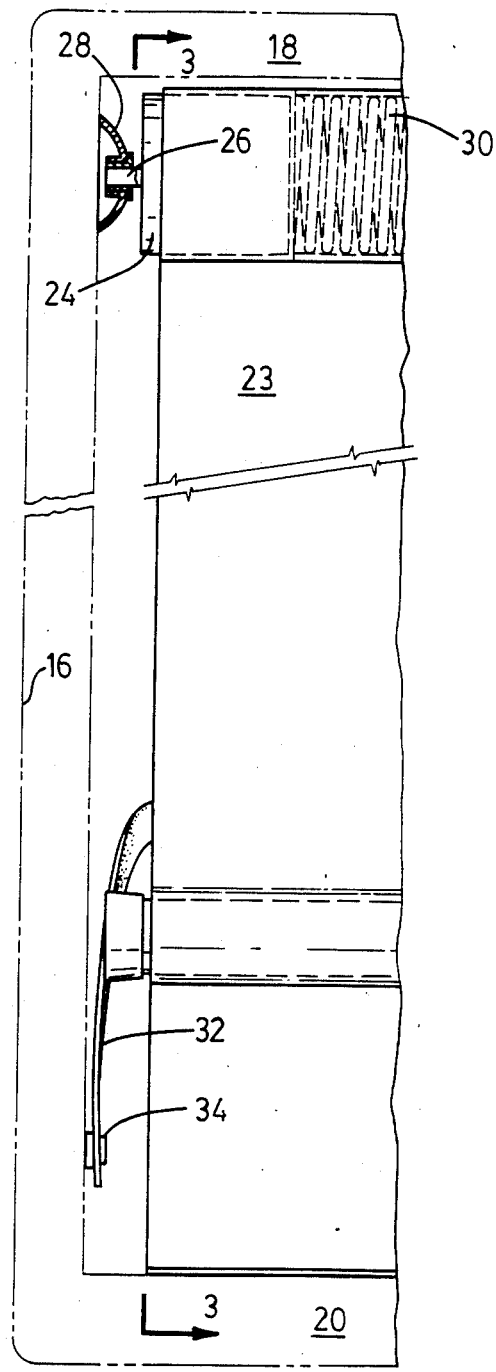
FIG. 2 is a somewhat schematic view of the vehicle taken from the rear in the direction of arrow 2 of FIG. 1.
Figure 3:
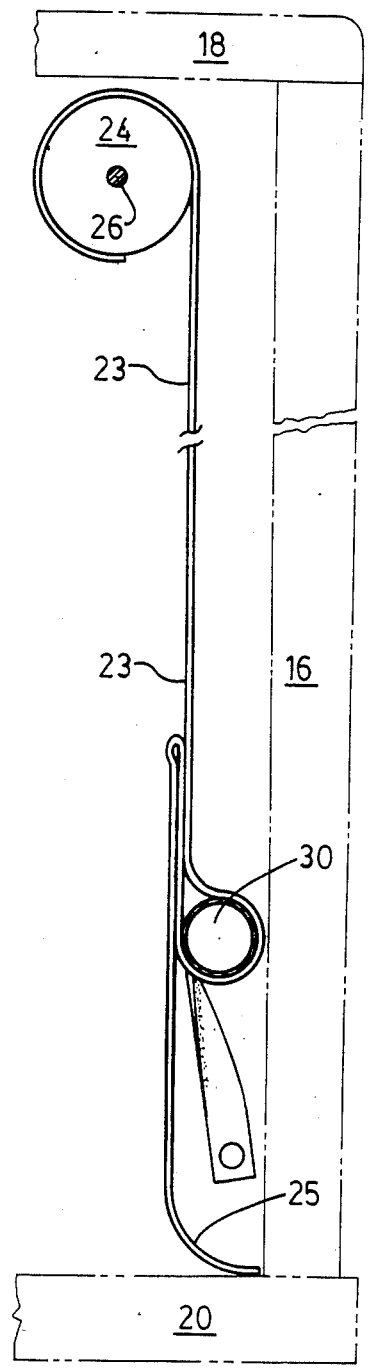
FIG. 3 is a section at 3—3 of FIG. 2.

The truck 10 has a pair of hinged doors 12 which enclose the rear aperture 14, as defined by the side posts 16, the top rail 18 and floor 20, of usual construction. Referring also to FIGS. 2 and 3, the subject curtain 22 has a curtain sheet 23, a roller 24 with a pintle 26 carried in bearing brackets 28, on which the roller 24 can rotate.

One of the pintle pins is slotted to its bracket to preclude rotation, having a coiled steel spring 30 secured thereto by the nearest end turn, (not shown). The spring 30 has the remote end turn thereof secured in driving relation with the roller 24. A ratchet of well known construction (not shown) controls the rotation of roller 24.

With the curtain sheet 23 in retracted condition, the spring 30 is in a lightly tensioned condition. Extension of sheet 23 downwardly progressively tensions the spring 30. Release of the ratchet mechanism is effected in the style usually associated with a window blind, by applying a sharp downward tug, and releasing the curtain 23 for upward rotation.

A curtain tongue portion 25 can be drawn in substantially sealing relation with the floor 20.

A slat 30, illustrated as being made of circular section stabilizes the curtain sheet 23, and serves as a new member, for handling the sheet 23. It may also serve as a tie-down attachment point. A pair of tie downs 32, equipped with commercial snap fasteners 34, are attachable to appropriate fasteners located adjacent the floor of the truck, and are readily accessible from outside the cargo space. The snap fasteners may be replaced by hooks, but snap fasteners are more applicable since they will not loosen or become slack as the extended curtain may bounce up and down during travel over rough roadways.

In operation the curtain sheet 23 and tongue 25 do not entirely seal the aperture 14, there being edge clearances between the curtain and the side walls 16. However, it has been found that the subject arrangement provides a suprising extent of protection to the interior cargo space against the general ingress of moisture. A certain degree of dampness on the floor per se is usually acceptable, in light of the general adoption of load pallets which sustain the cargo clear of the floor surface.

Experience has shown that cargo spoilage encountered in trucks relying entirely on closure doors 12 to effect sealing of the cargo space, has been substantially ameliorated by the adoption of the subject curtain.

In addition to providing a low cost, permanently available closure, the subject curtain affords rapid operation thereof in opening or closing mode, to facilitate multiple accessing of the cargo in partial loading or unloading activities.

What is claimed:

1. In combination a truck having an enclosed body, a large rear aperture comprising substantially the full cross section of the enclosed body, at least one door for substantially blocking said rear aperture when in a closed condition, and a roll-up curtain positioned within the truck body adjacent said rear aperture having a roller rotatably mounted adjacent the top of said body and extending transversely thereacross in substantially parallel relation with said closed door, flexible curtain means mounted on said roller for downward unrolling displacement therefrom, having a tongue portion to overlie a portion of the floor of said body located inwardly of said aperture, said flexible curtain means filling substantially all of said aperture when in an extended position to limit the ingress of moisture therepast, and being withdrawable upwardly in wrapping relation with said roller in substantially non-blocking relation with said aperture.

2. The combination as set forth in claim 1, including transverse bracing means secured to said flexible curtain means adjacent said tail portion.

3. The combination as set forth in claim 1, said roller having spring means therein for retracting said curtain upwardly, and ratchet means for controlling the operation of said spring means.

4. The combination as set forth in claim 3, said ratchet means including a plurality of latch means co-operating with a ratchet lever for holding said roller in latching relation.

5. The combination as set forth in claim 1, including securing means attached to said curtain adjacent said tail, and attachment means secured to said truck body adjacent the floor thereof, to receive said securing means in removable attached relation thereto, to hold said curtain in a closed condition against involuntary retraction thereof to a rolled condition.

6. The combination as set forth in claim 5, each said securing means and said attachment means comprising complementary portions of a snap fastener.

* * * * *